United States Patent Office 3,705,238
Patented Dec. 5, 1972

3,705,238
ANTIBIOTICS A204I AND A204II AND METHOD
FOR PRODUCTION THEREOF
Robert L. Hamill, New Ross, and Marvin M. Hoehn,
Indianapolis, Ind., assignors to Eli Lilly and Company,
Indianapolis, Ind.
Continuation-in-part of application Ser. No. 850,602, Aug.
15, 1969, which is a continuation-in-part of application Ser. No. 801,215, Dec. 6, 1968, which in turn is
a continuation-in-part of application Ser. No. 707,841,
Feb. 23, 1968, all now abandoned. This application
Sept. 14, 1970, Ser. No. 71,965
Int. Cl. A61k 21/00
U.S. Cl. 424—121                                10 Claims

ABSTRACT OF THE DISCLOSURE

Antibiotics A204I and A204II are co-produced by culturing *Streptomyces albus* NRRL 3384 in an aqueous, nutrient culture medium and are isolated as antibiotic A204 mixture via ethyl acetate extraction of filtered broth and mycelium followed by purification over activated carbon. Chromatography of A204 mixture affords separation of A204I and A204II as individual antibiotics having anticoccidial, insecticidal, anti-PPLO as well as antimicrobial activity.

CROSS REFERENCE TO RELATED APPLICATIONS

Figure 1:
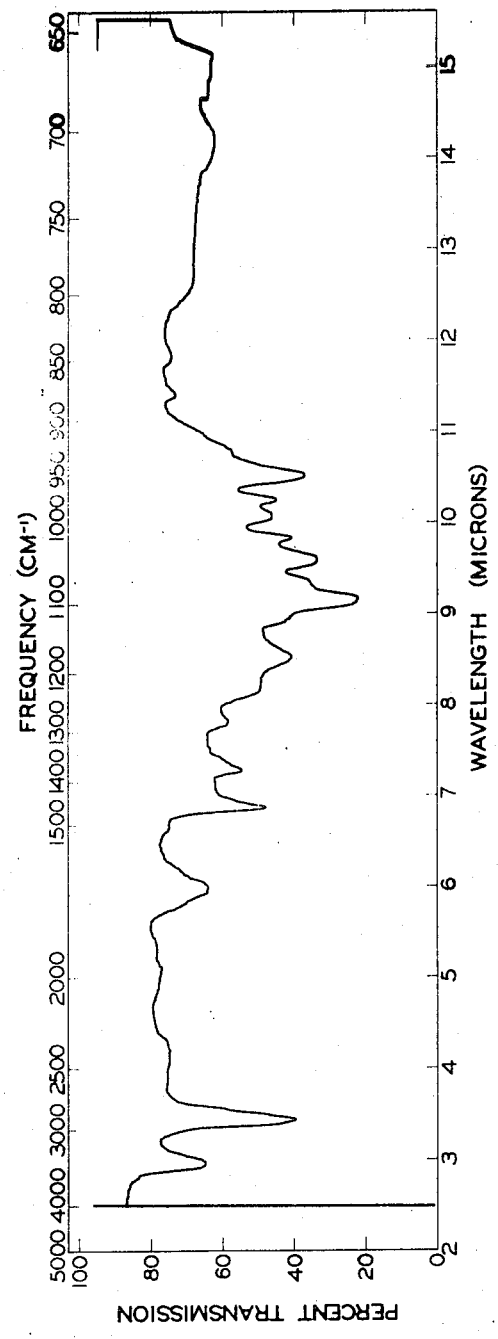

This application is a continuation-in-part of our copending application, Ser. No. 850,602, filed Aug. 15, 1969, now abandoned, which was a continuation-in-part of application Ser. No. 801,215, filed Dec. 6, 1968, and now abandoned, which was a continuation-in-part of Ser. No. 707,841, filed Feb. 23, 1968, and now abandoned.

SUMMARY OF THE INVENTION

This invention relates to novel antibiotics and to a method for their production. In particular it relates to acidic, non-nitrogenous antibiotics and to the alkali metal, alkaline earth metal, ammonium and substituted ammonium salts thereof.

The antibiotics described herein are arbitrarily designated as antibiotic A204I and antibiotic A204II. They are produced along with other unidentified antibiotic substances by culturing the organism *Streptomyces albus*, NRRL 3384, in an aqueous, nutrient culture medium under submerged aerobic fermentation conditions until a substantial level of antibiotic activity is produced. The antibiotics A204I and A204II are recovered from the fermentation medium as a mixture of the free acids by first extracting the filtered mycelium with an aqueous alcoholic solvent and combining the extract with the filtered broth. The broth is then acidified to about pH 3 and extracted with a suitable organic solvent such as ethyl acetate. The extract is evaporated to dryness to yield the crude mixture of antibiotics, designated as A204 and comprising antibiotics A204I and A204II. The crude A204 mixture is purified by passing a chloroform solution of the mixture over a chromatographic adsorbent, such as activated carbon or alumina, and eluting the antibiotic mixture therefrom with chloroform. The purified A204 mixture is obtained as an amorphous powder by evaporating the eluate. The A204 mixture of antibiotics is further purified and obtained in crystalline form by crystallization from an alcoholic solvent such as methanol or ethanol.

Alternatively, the A204 mixture of antibiotics can be recovered from the filtered mycelium and aqueous broth in the salt form, preferably as an alkali metal or alkaline earth cationic salt, in the following manner.

The mycleium is extracted as before with an aqueous alcoholic solvent and the extract is combined with the aqueous broth. In this instance the broth is basified to about pH 8.5 by the addition of an alkali metal or alkaline earth metal hydroxide or carbonate. The basic broth is then extracted with a suitable organic solvent such as an ester, for example ethyl acetate or amyl acetate. The organic extract is evaporated to dryness to yield the antibiotic A204 mixture in the salt form.

The A204 mixture of antibiotics and the A204I and A204II factors thereof have a high affinity for metallic ions, with which they readily form highly stable salts. This capacity for binding with metallic cations is reflected by the A204 antibiotics in the alternate basic isolation procedure described above. Although in this procedure the A204 containing broth is basified with an alkali metal or alkaline earth metal base such as sodium hydroxide or potassium hydroxide, the A204 salt form that is isolated is a mixed salt, for example the mixed sodium and potassium salt, formed with broth sodium or potassium ions occurring in and scavenged from the fermentation broth and the added sodium or potassium hydroxide or carbonate.

The preferred method of recovering the A204 antibiotics from the fermentation medium is the alternate basic isolation procedure. The A204 antibiotics are highly stable in the salt form and they can be obtained in the free acid form by reacting solutions of the salts with a mineral acid such as hydrochloric acid or sulfuric acid.

The antibiotic factors A204I and A204II are separated from the A204 mixture and isolated as individual substances by column chromatography of the A204 mixture over a suitable adsorbent, as, for example, silica gel. The A204 mixture is dissolved in a benzene:ethylacetate (7:3) solvent mixture and the solution is passed over silica gel. The column is eluted with the same solvent mixture until all of factor A204I has been collected in the eluate. The column is then eluted with a 1:1 benzene:ethyl acetate solvent system to obtain A204II in the eluate fractions.

Antibiotics A204I and A204II are chemically similar in that both are monocarboxylic acids containing multiple methoxyl groups. Factor A204II differs from factor A204I in that it has one less methoxyl group, as can be demonstrated by a comparison of the nuclear magnetic resonance spectrum (NMR) of each factor with that of the other factor.

Antibiotics A204I, A204II and the A204 mixture inhibit the growth of microoragnisms pathogenic to animal and plant life. The A204 antibiotics also exhibit insecticidal activity. In particular the A204 factors and mixtures thereof are highly effective in controlling coccidiosis in poultry.

DETAILED DESCRIPTION

The A204 mixture of antibiotics is comprised mainly of factors A204I and A204II. Antibiotic factor A204I is produced in greater abundance than factor A204II, which commonly is produced in amounts up to about 5 percent of the total antibiotic A204 mixture isolated. Other antibiotic factors produced in the A204 fermentation occur in such minor amounts that their recovery is unrewarding.

Antibiotic A204I is a white, crystalline solid, melting at about 96–98° C. when crystallized from ethyl ether. A204I is soluble in dimethylformamide, dimethylsulfoxide, esters such as methyl acetate, ethyl acetate, amyl acetate and the like: ketones such as acetone, methyl ethyl ketone and methyl isobutyl ketone; the halogenated hydrocarbons such as chloroform, carbon tetrachloride and ethylene dichloride; and the aromatic hydrocarbons such as benzene, toluene and the xylenes.

It is slightly soluble in the alcohols such as methanol, ethanol, isopropanol and t-butanol and is very slightly soluble in water.

The specific optical rotation of A204I, as the crystalline free acid when dried at room temperature in vacuo over anhydrous calcium chloride for 15 hours is $[\alpha]_D^{25}$ +68.12° (C=1 percent, w./v. in methanol).

Electrometric titration of antibiotic A204I in a 66 percent dimethylformamide-water solution revealed the presence of one titratable group of pK'a=6.1.

The precise molecular weight of antibiotic A204I has not yet been determined. The molecular weight of antibiotic A204I, calculated from the titration data is about 900. X-ray analysis of the crystalline silver and sodium salts indicated an average molecular weight of 937.

An average of several elemental analyses of crystalline A204I, dried in vacuo at about 80° C. over phosphorus pentoxide, gave the following values:

| Element: | Percent |
|---|---|
| Carbon | 61.74 |
| Hydrogen | 9.37 |
| Oxygen | 28.38 |

Chemical and physical analyses of crystalline A204I indicate the presence of 4 to 5 methoxy groups.

The infrared absorption spectrum of A204I as the crystalline free acid in chloroform is shown in FIG. 1 of the accompanying drawings. The distinguishable bands in the infrared spectrum over the range of 2.0 to 15.0 microns are as follows: 2.95; 3.43; 5.95; 6.87; 7.26; 7.80; 8.52; 8.95; 9.17; 9.34; 9.59; 9.82; 10.07; 10.24; 10.51; 10.77; 11.40; and 11.80 microns.

The new antibiotic has no characteristic ultraviolet absorption pattern.

Paper chromatography of antibiotic A204I on Whatman No. 1 paper gave the following $R_f$ values: $R_f$=0.14 in a solvent of water, methanol, acetic acid, and benzene in a volume ratio of 72:24.5:3:0.5; $R_f$=0.87 in a solvent of 10 percent aqueous n-propanol; $R_f$=0.33 in a solvent containing water, methanol, and acetone in a ratio of 12:3:1 (solution was adjusted to pH 10.5 with $NH_4OH$ and then to pH 7.3 with $H_3PO_4$). In determining the foregoing values, the antibiotic was applied to the paper in a methanolic solution. Bioautographs were obtained by placing the paper chromatogram on agar plates seeded with *Bacillus subtilis* as the test organism.

When A204I is subjected to thin-layer chromatography on silica gel plates in an ethyl acetate solvent, utilizing a vanillin or sulfuric acid spray as a detector, it has an $R_f$ value of about 0.8.

The sodium salt of antibiotic A204I is a white, crystalline solid, melting at about 178–179° C. and having a molecular weight of about 960 as determined by X-ray analysis. The sodium salt is soluble in dimethylformamide dimethyl sulfoxide, esters such as ethyl acetate, methyl propionate and amyl acetate, the commonly employed ketone solvents such as acetone, methyl ethyl ketone and methyl isobutyl ketone, the halogenated hydrocarbon solvents such as chloroform, carbon tetrachloride and ethylene dichloride, the aromatic hydrocarbons such as benzene, toluene and the xylenes and, like the free acid form of A204I, it is soluble in diethyl ether and only slightly soluble in the common alcohol solvents such as methanol, ethanol, isopropanol and n-butanol. The A204I sodium salt is highly insoluble in water.

The specific optical rotation of the crystalline sodium salt of A204I, dried at room temperature in vacuo over anhydrous calcium chloride for about 15 hours, is $[\alpha]_D^{25}$ +54.95° (C=2 percent, w./v. in methanol).

Figure 2:
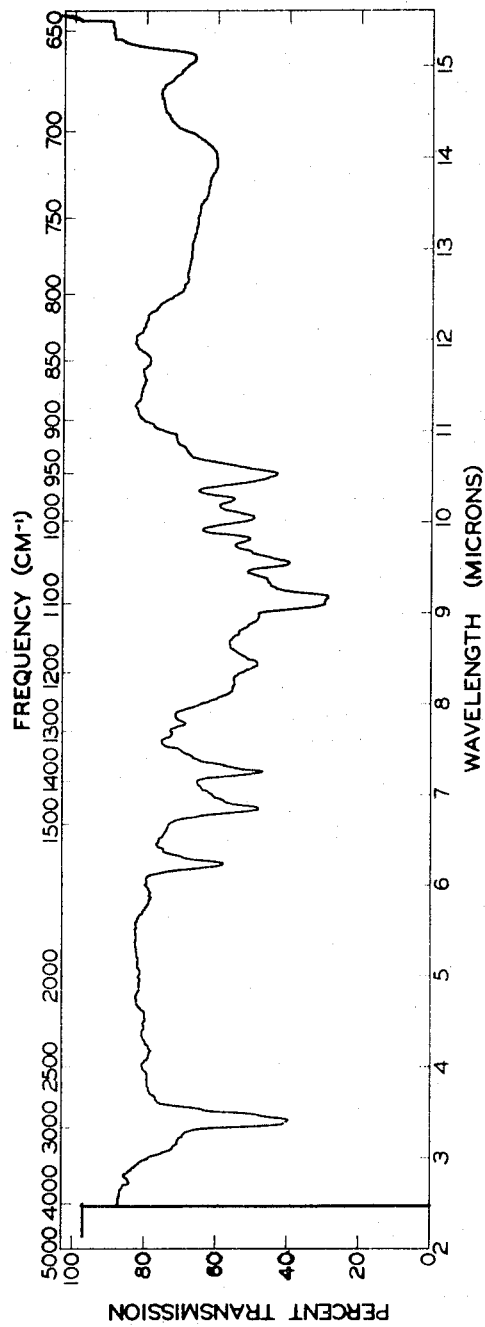

The infrared absorption spectrum of the sodium salt of antibiotic A204I in chloroform is shown in FIG. 2 of the accompanying drawings. The distinguishable bands in the infrared spectrum over the range of 2.0 to 15.0 microns are as follows: 3.1–3.2 (broad); 3.44; 6.26; 6.87; 7.29; 7.67; 7.79; 8.45; 8.96; 9.11; 9.18; 9.36; 9.56; 9.82; 10.05; 10.26; 10.54; 10.95; and 11.77 microns.

The molecular weight of the hydrated crystalline silver salt of antibiotic A204I, determined from X-ray data, is about 1099. Crystals of the silver salt are colorless, but are sensitive to light and X-rays, turning dark brown after two days irradiation in air. The observed density of the silver salt, measured by flotation in aqueous $ZnCl_2$ is 1.293 g./cm.$^3$.

Antibiotic A204II as isolated from the A204 mixture of antibiotics is obtained as the mixed sodium-potassium salt having a melting point of about 177–179° C. when crystallized from acetone.

The A204II mixed sodium and potassium salt has solubility characteristics similar to factor A204I and the sodium salt thereof. It is very insoluble in water and slightly soluble in alcohol solvents such as methanol and ethanol. It is soluble in ether, the commonly employed ester solvents such as ethyl acetate and amyl acetate, the ketone solvents such as acetone, methyl ethyl ketone and methyl isobutyl ketone, the halogenated hydrocarbon solvents such as chloroform, carbon tetrachloride and ethylene dichloride, the aromatic hydrocarbon solvents such as benzene, toluene and the xylenes and the commonly employed solvents dimethylformamide and dimethyl sulfoxide.

The specific optical rotation of the mixed sodium-potassium salt of A204II dried at room temperature in vacuo over anhydrous calcium chloride for about 15 hours was found to be $[\alpha]_D^{25}$ +42.3° (C equals 1 percent w./v. in methanol).

Electrometric titration of the mixed sodium-potassium salt of A204II in a 66 percent dimethylformamide-water solution revealed the presence of one titratable group of pK'a=6.3.

The precise molecular weight of A204II has not yet been determined.

An average of several elemental analyses of the crystalline mixed sodium-potassium salt of A204II, dried in vacuo at about 80° C. over phosphorus pentoxide, gave the following values:

| Element: | Percent |
|---|---|
| Carbon | 60.66 |
| Hydrogen | 8.76 |
| Oxygen | 27.09 |

Several atomic absorption analyses indicated that the compound was a mixed sodium-potassium salt, contains one mole of mixed cation per mole of A204II.

Figure 3:
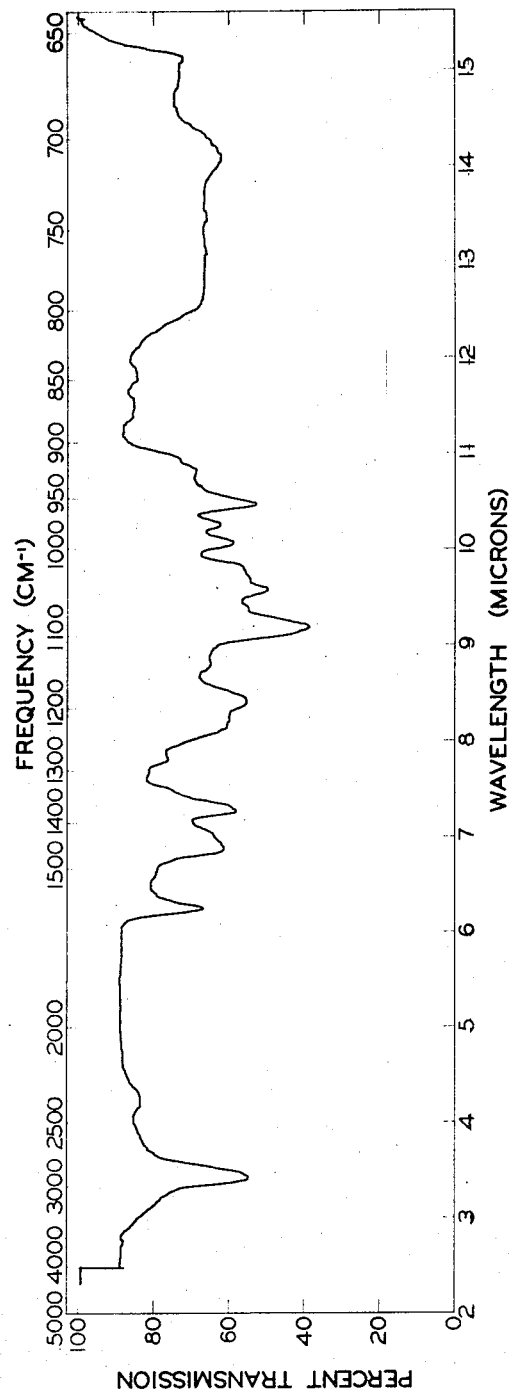

The infrared absorption spectrum of the mixed sodium-potassium salt of A204II in chloroform as shown in FIG. 3 of the drawings has the following distinguishable bands in the infrared spectrum over the range of 2.0 to 15.0 microns: 3.20; 3.45; 6.26; 6.90; 7.30; 7.80; 8.20; 8.50; 8.80; 9.22; 9.39; 9.59; 9.70; 9.82; 10.08; 10.26; 10.48; 10.83; 10.96; 11.30; 11.55; and 11.78 microns.

The mixed sodium-potassium salt of A204II has no characteristic ultraviolet absorption pattern.

Thin-layer chromatography of the mixed sodium-potassium salt of A204II on silica gel plates gave an $R_f$ value of 0.75 in an ethyl acetate system using a sulfuric acid spray for detection.

As previously mentioned the A204 mixture of antibiotics and the A204I and A204II factors thereof are acidic substances which form salts with organic and inorganic bases. Representative of the inorganic bases forming cationic salts with the A204 antibiotics include the alkali metal hydroxides such as lithium hydroxide, sodium hydroxide and potassium hydroxides, the alkali metal carbonates and bicarbonates such as lithium carbonate, sodium carbonate, sodium bicarbonate and potassium carbonate, the alkaline earth metal hydroxides and carbonates such as calcium hydroxide, magnesium carbonate, magnesium hydroxide, strontium carbonate and like inorganic bases.

Illustrative of the organic bases forming salts with the A204 antibiotics are the primary, secondary and tertiary $C_1$–$C_4$ lower alkyl and lower hydroxyalkyl amines such as methylamine, ethylamine, n-propyl amine, isopropylamine, sec-butylamine, di-ethylamine, di-n-butylamine, triethylamine di-isopropylamine, methyl-n-butylamine, methylethylamine, ethanolamine, diethanolamine, 3-hydroxypropylamine, di-(3-hydroxypropyl)-amine, 4-hydroxybutylamine and the like.

The ammonium salts of the A204 antibiotics are prepared with ammonia or ammonium hydroxides.

The alkali metal and alkaline earth metal cationic salts of the A204 antibiotics are prepared according to procedures commonly employed for the preparation of cationic salts. For example, the free acid form of the A204 mixture, A204I or A204II is dissolved in a suitable solvent such as warm methanol or ethanol and an aqueous methanol solution of the desired inorganic base is added to the antibiotic solution. The A204I antibiotic cationic salts can be isolated by filtration and recrystallization or by evaporation of the solvent and purification by recrystallization.

The salts formed with organic amines can be prepared in a similar manner. For example the gaseous or liquid amine can be added to a solution of the A204 antibiotic mixture or either factor thereof in a suitable solvent such as acetone and the solvent and excess amine can be removed by evaporation.

The A204 mixture of antibiotics, referred to herein as antibiotic A204, the individual factors A204I and A204II and the salts thereof exhibit excellent activity against coccidiosis infections in fowl. When incorporated in the diet of chickens, for example, at a level of from 9 to 45 g. per ton of feed, antibiotic A204, the A204I or A204II factors, and the salts thereof are effective in controlling single infections of *Eimeria tenella*, *Eimeria acervulina*, and *Eimeria maxima*. The same levels have been found effective in controlling mixed infections of *Eimeria brunetti* and *Eimieria tenella*.

Antibiotic A204 has also been found to be effective against various single and mixed infections of coccidiosis in turkeys when incorporated into the diet at a level of from about 10 to 40 g. per ton of feed. Such infections include *E. adenoeides*, *E. melagrinitis*, *E. dispersa*, *E. gallapovonic*, and *E. mileagrides*.

In order to ascertain the efficacy of antibiotic A204 and its salts against coccidiosis infections, groups of five nine-day-old chicks were fed a mash diet containing antibiotic A204 or its sodium salt uniformly dispersed therein. After having been on this ration for 48 hours, each bird was infected with 200,000 sporulated oocysts of the particular species of Eimeria being tested. Other groups of five nine-day-old chickens were fed a similar mash diet free from the antibiotic A204 or its salts. These were also infected after 48 hours and served as positive controls. Other groups of five nine-day-old chickens were fed the mash diet free of antibiotic A204 and were not infected with coccidiosis. These served as normal controls. The results of treatment were evaluated seven days after infection and are shown in the following tables:

TABLE I

[Efficacy of antibiotic A204 against *E. tenella*]

| Compound | Gram/ton | Percent mortality | Total weight gain | Total feed concentration | Feed efficiency | Average weight gain (survivors) | Oocysts passed per [1] bird |
|---|---|---|---|---|---|---|---|
| Normal controls | | 0 | 3,283 | 5,307 | 1.62 | 164 | |
| A204 | 9.0 | 5 | 2,572 | 5,059 | 1.97 | 141 | 1.93 |
| | 13.6 | 0 | 3,102 | 5,250 | 1.69 | 155 | 0.59 |
| | 18.0 | 0 | 3,341 | 5,364 | 1.61 | 167 | |
| | 22.7 | 0 | 3,286 | 5,384 | 1.64 | 164 | |
| | 27.0 | 0 | 3,109 | 5,201 | 1.67 | 155 | |
| | 41.0 | 0 | 3,147 | 5,067 | 1.61 | 158 | |
| Infected controls | | 75 | −998 | 3,031 | | 69 | 2.02 |

[1] Millions.

TABLE II

[Efficacy of antibiotic A204 against *E. necatrix*]

| Compound | Gram/ton | Percent mortality | Total weight gain | Total feed concentration | Feed efficiency | Average weight gain (survivors) | Oocysts passed per [1] bird |
|---|---|---|---|---|---|---|---|
| Normal controls | | 0 | 3,283 | 5,307 | 1.62 | 164 | |
| A204 | 9.0 | 0 | 3,086 | 5,172 | 1.68 | 154 | 0.3 |
| | 13.6 | 0 | 3,253 | 5,347 | 1.64 | 163 | 0.0 |
| | 18.0 | 0 | 3,149 | 5,150 | 1.64 | 157 | 0.0 |
| | 22.7 | 0 | 3,059 | 5,184 | 1.69 | 153 | 0.0 |
| | 27.0 | 0 | 3,149 | 5,106 | 1.62 | 157 | 0.0 |
| | 41.0 | 0 | 2,881 | 4,910 | 1.70 | 144 | 0.0 |
| Infected controls | | 60 | −468 | 2,963 | | 73 | 0.8 |

[1] Millions.

TABLE III

[Efficacy of antibiotic A204 against *E. maxima*]

| Compound | Gram/ton | Percent mortality | Total weight gain | Total feed concentration | Feed efficiency | Average weight gain (survivors) | Oocysts passed per [1] bird |
|---|---|---|---|---|---|---|---|
| Normal controls | | 0 | 2,875 | 4,609 | 1.60 | 144 | |
| A204 | 9.0 | 0 | 2,770 | 4,588 | 1.66 | 138 | 5.32 |
| | 13.6 | 0 | 2,758 | 4,608 | 1.67 | 138 | 1.88 |
| | 18.0 | 0 | 2,820 | 4,458 | 1.58 | 141 | 0.52 |
| | 22.7 | 0 | 2,830 | 4,445 | 1.57 | 141 | 0.28 |
| | 27.0 | 0 | 2,761 | 4,523 | 1.64 | 138 | 0.05 |
| | 41.0 | 0 | 2,487 | 4,429 | 1.78 | 124 | 0.00 |

[1] Millions.

TABLE IV

[Efficacy of antibiotic A204 against *E. acervulina*]

| Compound | Grams/ ton | Percent mortality | Total weight gain | Total feed concentration | Feed efficiency | Average weight gain (survivors) |
|---|---|---|---|---|---|---|
| Normal Controls | | 0 | 3,062 | 5,101 | 1.67 | 156 |
| | 40 | 0 | 2,433 | 4,614 | 1.90 | 137 |
| Infected controls | | 5 | 1,823 | 4,233 | 2.32 | 108 |

TABLE V

[Efficacy of antiboitic A204 against a mixed infection of *E. burnetti* and *E. tenella*]

| Compound | Gram/ ton | Percent mortality | Total weight gain | Total feed concentration | Feed efficiency | Average weight gain (survivors) | Oocysts passed per 1/ bird |
|---|---|---|---|---|---|---|---|
| Normal controls | | 0 | 2,875 | 4,609 | 1.60 | 144 | |
| A204 | 9.0 | 5 | 2,318 | 4,218 | 1.82 | 126 | 12.09 |
| | 13.6 | 0 | 2,643 | 4,320 | 1.64 | 132 | 4.46 |
| | 18.0 | 0 | 2,756 | 4,663 | 1.69 | 138 | 2.74 |
| | 22.7 | 0 | 2,798 | 4,506 | 1.61 | 140 | 0.75 |
| | 27.0 | 0 | 2,883 | 4,569 | 1.58 | 144 | 0.07 |
| | 41.0 | 0 | 2,613 | 4,274 | 1.64 | 131 | 0.00 |
| Infected controls | | 40 | −211 | 2,985 | | 49 | 2.47 |

1 Millions.

TABLE VI

Efficacy of antibiotic A204 against a mixed infection of *E. brunetti*, *E. tenella*, *E. necatrix*, *E. maxima*, *E. acervulina*, *E. hagani*, and *E. mivati*

| Compound | Grams/ ton | Percent mortality | Total weight gain | Total feed concentration | Feed efficiency | Average weight gain (survivors) |
|---|---|---|---|---|---|---|
| Normal controls | | 0 | 3,271 | 5,724 | 1.75 | 164 |
| A204 | 80 | 0 | 1,652 | 3,874 | 2.35 | 83 |
| | 40 | 0 | 3,243 | 5,636 | 1.74 | 162 |
| | 20 | 0 | 2,665 | 5,133 | 1.93 | 133 |
| Infected controls | | 50 | 153 | 4,181 | 27.33 | 104 |

The insecticidal and acaricidal activity of the antibiotics of this invention is illustrated by the following tests against representative insects and mites. The test results are tabulated in Table VII.

TEST METHODS

Mexican bean beetle

*Epilachna varivestis* (Coleoptera).—Cuttings of four six-day-old Bountiful snap bean plants containing two leaves with approximately 5 square inches of leaf surface, are placed in water. The leaves are sprayed to wetting with about 5–10 ml. of a formulation containing a predetermined level of the test compound. Half of the formulation is sprayed on the top surface and half on the bottom surface of the leaf using a DeVilbiss atomizer at 10 p.s.i. held at a distance of about 18 inches from the leaf. After the leaves have dried, they are cut from the stem and placed separately in petri dishes. Ten third instar, non-molting Mexican bean beetle larvae grown on Bountiful snap beans are placed on each leaf. Controls consist of two leaves sprayed with 5 ml. of a 500 p.p.m. malathion formulation (reference standard), two leaves sprayed with the formulation without the active ingredient, and two leaves held as untreated controls. After 48 hours, a mortality count is made and the amount of feeding noted. Moribund larvae are counted as dead. The following rating scale is used:

| Percent dead: | Rating |
|---|---|
| 0–10 | 0 |
| 11–20 | 1 |
| 21–30 | 2 |
| 31–40 | 3 |
| 41–50 | 4 |
| 51–60 | 5 |
| 61–70 | 6 |
| 71–80 | 7 |
| 81–90 | 8 |
| 91–100 | 9 |

Southern armyworm

*Prodenia eridania* (Lepidoptera).—Ten uniform Southern armyworm larvae about 1–1.5 cm. in length, grown on Henderson lima beans, are placed on excized bean leaves in petri dishes. The bean leaves are obtained and sprayed with the insecticide in the same way as are the snap bean leaves in the Mexican bean beetle test. The reference standards in this instance are leaves sprayed with 5 ml. of 100 p.p.m. DDT solution. Mortality counts are made 48 hours after spraying and again moribund larvae are counted as dead. Missing larvae, which have probably been eaten, are counted as alive. The same rating scale is used as in the Mexican bean beetle test.

Melon aphid

*Aphis gossyppi* (Hemiptera). — (A) Contact: Four blue hubbard squash seeds are planted per container in vermiculite and the containers are watered from the bottom. After six days, the two weakest plants are cut off and one cotyledon and the primary leaves are removed from each of the two remaining plants. The remaining cotyledon is infested with 100 melon aphids from a stock colony by pinning the cotyledon against aphid-infested squash cotyledon from the colony and allowing the aphids to transfer. After transfer, the colony leaf is removed. Forty-eight hours later, the infested leaves are sprayed to wetting with formulations containing graded amounts of the insecticide using a DeVilbiss atomizer at 10 p.s.i. held at 12–15 inches from the plant. Controls consist of two infested, unsprayed squash plants and two infested plants sprayed to wetting with a formulation containing 100 p.p.m. malathion as a reference standard. The mortality is estimated 24 hours after spraying by observation using a 10-power dissecting microscope. The same rating scale is used as before.

(B) Systemic: A test to determine the systemic insecticidal activity of the antibiotics described herein is carried out as follows: Two blue hubbard squash seeds are planted in vermiculite in paper cups as indicated above and six days later, the weakest plant is cut off. One cotyledon and the primary leaves are removed from the remaining plant. The remaining cotyledon is infested with approximately 100 melon aphids by the method indicated above. Twenty-four hours later 20 ml. of a formulation containing a pre-determined amount of the compounds under test is poured into each cup. Filter paper is placed over the vermiculite in the cup so that aphids that drop off the plant can be saved and counted. Controls consist of 2 untreated squash plants, 2 plants treated with the formulating medium alone, and, as a positive control, 2 plants treated with 20 ml. of a formulation containing 10 p.p.m. of demeton. Mortality is estimated four days after the formulation is placed in the cup by cutting off the cotyledon and counting the aphids using a 10-power dissecting microscope. The aphids that have fallen from the filter paper are also taken into consideration. The same rating scale is used as heretofore.

Two-spotted spider mite

*Tetranychus urticae* (Acarina).—The procedure in this test is the same as that in the previous aphid test, except that about 100 two-spotted spider mites from a stock colony raised on squash plants are transferred to a cut squash cotyledon. The mortality is estimated 48 hours after spraying. The same rating scale is used.

Milkweed bug

*Oncopelis fasciatus* (Hemiptera).—Ten adult milkweed bugs are chilled and placed in a test cage. The cages containing the bugs are sprayed with 5 ml. of a test formulation containing a pre-determined amount of the insecticide, using a DeVilbiss atomizer at 10 p.s.i. held 33 inches from the top of the cage. After the cage has been allowed to dry, the bugs are fed and watered for 48 hours. A formulation containing 500 p.p.m. of malathion is used as a reference standard and two unsprayed cages are kept as controls. Mortality counts are made 48 hours after spraying. Moribund adults are considered dead. The same rating scale is employed as before.

TABLE VII
[Efficacy of antibiotic A204 as an insecticide]

| Insect | Route | Rating (p.p.m.) | | | | | |
|---|---|---|---|---|---|---|---|
| | | 1,000 | 500 | 250 | 100 | 50 | 25 |
| Mexican bean beetle | Stomach | 8 | 4 | 0 | | | |
| Southern army worm | do | 8 | 9 | 8 | 8.5 | 3.5 | 3 |
| Melon aphid | Contact | 3.5 | 2 | 1 | | | |
| | Systemic | 7 | 0 | 0 | | | |
| Two-spotted spider mite. | Contact | 9 | 7 | 7 | 8 | 7 | 6 |
| Milkweed bug | do | 9 | 9 | 4 | 3 | 1 | 2 |

The novel A204 antibiotic mixture, as well as its individual factors, also exhibits inhibitory action against the growth of microbial organisms including gram-positive bacteria and fungi, which are pathogenic to animal and plant life. Hence antibiotic A204 is also useful, when incorporated into disinfectant solutions, for sterilizing surfaces around swimming pools, farm buildings housing livestock and the like, and for maintaining such surfaces free of bacterial and fungal contaminants. The levels at which antibiotic A204I shows inhibition against the growth of illustrative organisms are set forth in Table VIII. The inhibitory levels were determined by the agar dilution test. In the agar dilution test, the test organism was streaked on a series of agar plates containing various concentrations of antibiotic A204I to determine the minimum concentration of antibiotic A204I in mcg./ml. (micrograms per milliliter) in the agar substrate which inhibited the growth of the organism over a period of 24 hours.

TABLE VIII

| Test organism (strain): | Mcg./ml.[1] |
|---|---|
| Staphylococcus aureus (3055) | 6.25 |
| Bacillus subtilis (X12–1) | 6.25 |
| Mycobacterium avium (X–85) | 1.56 |
| Streptococcus faecalis | 1.56 |
| Lactobacillus casei | 1.56 |
| Leuconostoc citrovorum | 0.39 |
| Trichophyton mentagrophytes | 25 |
| Xanthomonas phaseoli | 100 |
| Botrytis cineraea | 100 |
| Colletotrichum pisi | 100 |
| Helminthosporum sativum | 100 |
| Pullularia sp. | 100 |
| N. gruberi (HB–1) in MK$_2$ tissue culture | 100 |

[1] Minimum inhibitory concentration (24 hours).

The salts of antibiotic A204I, exhibit comparable in vitro and in vivo activity. Such salts include the alkali metal salts such as the sodium, potassium, and lithium salts, the alkaline earth metal salts, such as the calcium, magnesium, and strontium salts, the ammonium salt, substituted ammonium salts as hereinabove described, and various heavy metal salts such as the silver, copper and zinc salts.

The mixed sodium and potassium salt of A204II also exhibits inhibitory action against the growth of a number of microbiological organisms including gram positive bacteria and fungi which are pathogenic to animal and plant life. Hence A204II and its salts are also useful when incorporated into disinfectant solutions for sterilizing surfaces around swimming pools, farm buildings, housing livestock, and the like, and for maintaining such surfaces free of bacterial and fungal contaminants. The levels at which A204II inhibits the growth of illustrative organisms are set forth in Table IX. The inhibitory levels were determined as described hereinabove.

TABLE IX

| Test organism: | Mcg./ml.[1] |
|---|---|
| Staphylococcus aureus | 12.50 |
| Bacillus subtilis | 3.12 |
| Mycobacterium avium | 12.50 |
| Streptococcus faecalis | 3.12 |
| Lactobacillus casei | 6.25 |
| Leuconostoc citrovorum | 6.25 |
| Alternaria solani | 100 |
| Botyrytis cinerea | 50 |
| Colletotrichum pisi | 50 |
| Helminthosporium sativium | 50 |

[1] Minimum inhibitory concentration.

The A204 antibiotics of this invention also exhibit activity against bean powdery mildew, and maize dwarf virus at concentrations of from 16 to 400 p.p.m., and hence are also useful in controlling such plant viruses and fungi. The above activity was established as follows:

In assaying the fungicidal effect of the compounds of this invention against *Erysiphe polygoni*, the causative organism of bean powdery mildew, the following procedure was utilized.

Three bean seeds (Kentucky Wonder variety) were planted in 4-inch clay pots and allowed to germinate. The plants were thinned to two plants per pot. Ten days from the day of planting, the sodium salt of antibiotic A204 was sprayed on all leaf surfaces of the bean plants and allowed to dry. The plants were then placed in a greenhouse, and Kentucky Wonder Beans heavily infested with powdery mildew were placed above the plants for about five days, after which the infested beans were removed. At the end of five additional days, the plants were observed for development of the disease. The appearance of the treated plants was compared with that of the control plants, and ratings of the control of the fungus were recorded.

The control rating scale used was as follows:

0—no control
1—slight control
2—moderate control
3—good control
4—complete control, no fungus In assaying the viricidal effect of the compounds of this invention against maise dwarf mozaic virus, the following procedure was used:

Four corn seeds were planted in 4-inch plastic pots. Ten days from the day of planting, the first leaf of each plant was inoculated by rubbing a cotton swab saturated with virus-containing plant sap on the leaf which had been dusted with 400 mesh Carborundum. The sodium salt of antibiotic A204 was then sprayed on all leaf surfaces and allowed to dry. The plants were then placed in the greenhouse for about 8 days. At the end of the 8 days, the symptoms of the virus disease were observed. The observations were continued for three additional days and the ratings of the control of the virus were recorded. The control rating scale used was as follows:

Disease rating:
1—severe
2—moderately severe
3—moderate
4—slight
5—no disease

The results of the above testing are shown in the following table.

TABLE X

| Disease | Host | Rating (p.p.m.) | | |
|---|---|---|---|---|
| | | 400 | 80 | 16 |
| Bean powdery mildew | Bean | +4 | +3 | 2 |
| Maize dwarf mozaic virus | Corn | 5 | 5 | 1 |

Antibiotic A204 can be produced by culturing a hitherto unknown strain of *Streptomyces albus* under aerobic conditions in a culture medium containing assimilable sources of carbon, nitrogen, and inorganic salts. The organisms were first isolated from soil samples obtained from Perry, Florida.

The organisms were isolated from the above soil samples by suspending portions of the soil samples in sterile distilled water, and by streaking the suspensions on nutrient agar plates. The seeded nutrient agar plates were incubated at about 30° C. for several days. At the end of the incubation time, colonies of the A204-producing organisms were transferred by means of a sterile platinum loop to agar slants. The inoculated agar slants were then incubated to provide larger amounts of inoculum for the production of antibiotic A204.

The novel organism capable of producing antibiotic A204 has been placed on permanent deposit, without restriction, with the culture collection of the Northern Utilization Research anl Development Division, Agricultural Research Service, U.S. Department of Agriculture (formerly Northern Regional Research Laboratories), Peoria, Ill., and is available to the public under culture No. NRRL 3384.

Because of the uncertainty of taxonomic studies with the Streptomyces group of organisms, there is always an element of organism. However, the organism which produces antibiotic A204 appears to resemble most nearly, in its most important characteristics, the published description of the organisms *Streptomyces albus*, *Streptomyces albidoflavus*, and *Streptomyces flaveolus*. However, we consider the culture to be a strain of *S. albus*, (Rossia Doria) Waksman and Henrici, based upon the description of the neotype strain of *S. albus* ATCC 3004 by Lyons and Pridham [J. Bacteriol 83; 370–380 (1962)], and the *S. albus* strain of IMRU 3005 described by Waksman [The Actinomycetes, vol. II "Classification, Identification, and Description of Genera and Species," Williams and Wilkins Co., Baltimore (1961)].

Despite the similarities, however, sufficient differences exist to distinguish the novel organism employed in this invention from all previously described strains of *S. albus*. Therefore, we have classified the organism NRRL 3384 as a novel strain of *Streptomyces albus*.

The detailed descriptions contained herein are made with particular reference to the newly found organism NRRL 3384. However, it is to be understood that the production of antibiotic A204 by the growing mutants of this A204-producing organism is within the scope of this invention. Such other mutants can be produced by known procedures as by subjecting the above strain to the action of X-ray, ultraviolet radiation, or chemical agents such as nitrogen mustards.

The methods employed in the taxonomic studies of the antibiotic A204-producing strain of *S. albus* were those recommended for the International Streptomyces Project described by Shirling and Gottlieb, "Methods for Characterization on Streptomyces Species, Intern. Bull. Systematic Bacterial: 16, 313–340 (1966), along with other supplementary tests. Carbon utilization tests were carried out according to the method described by Pridham and Gottlieb, J. Bac. 56, 107 (1948). The data obtained from the taxonomic studies are shown in tabular form below. Color names were assigned according to the ISCC-NBS method (Kelly and Judd, "The ISCC-NBS Method of Designating Colors and a Dictionary of Color Names." U.S. Dept. of Commerce Circ. 553, Washington, D.C.). Figures in parentheses refer to Tresner and Backus color series [Tresner and Backus (1966), "System of Color Wheels for Streptomyces Taxonomy," Applied Microbiol. 11: 335–338]. Maerz and Paul color blocks are enclosed in brackets. (Maerz and Paul, 1950, Dictionary of Color. McGraw-Hill, New York.)

TABLE XI
[Description of culture NRRL 3384]

| Property observed | Characteristic |
|---|---|
| Morphology | Spiral sporophores produced containing 3 to 50 spores per chain, usually 10 to 50; spores ovoid to elongate, $1.9\mu \times 1.3\mu$; smooth spore surfaces as observed in electron micrographs. |
| Cultural characteristics on: | |
| Calcium malate | Growth abundant, reverse pale yellow green [10B1]; sporulation and aerial mycelium abundant, (7) pale yellow, 2ba [11C1]; no soluble pigment; medium slightly cleared. |
| Tomato paste oatmeal | Abundant growth, grayish yellow reverse [11B2]; sporulation and aerial mycelium abundant (W) white a; no soluble pigment. |
| ICP No. 2 (yeast-malt agar). | Abundant growth, grayish yellow reverse [11B2]; sporulation and aerial mucelium abundant (Y) pale yellow, 2ba [11C1]; no soluble pigment. |
| ICP No. 3 (oatmeal agar). | Fair growth, reverse white; sporulation and aerial mycelium fair (W) white a; no soluble pigment. |
| ICP No. 4 (inorganic salts-starch agar). | Abundant growth, reverse grayish yellow [11B2]; abundant sporulation and aerial mycelium (Y) pale yellow 2ba [11C1]; no soluble pigment. |
| ICP No. 5 (glycerol-asparagine agar). | Abundant growth, reverse pale yellow green [10B1]; abundant sporulation and aerial mycelium (W) white a; no soluble pigment. |
| Czapek's agar | Good growth, reverse white; good sporulation and aerial mycelium (W) white a; no soluble pigment. |
| Tyrosine agar | Very poor growth; no colors assigned. |
| Glucose asparagine | Fair growth, reverse yellow [11C1]; fair sporulation and aerial mucelium (Y) pale yellow 2ba [11C1]; no soluble pigment. |
| Emerson's agar | Abundant growth, reverse grayish-yellow [12B3]; abundant sporulation and aerial mycelium (GY) yellowish-gray, 2dc [10A2]; no soluble pigment. |
| Bennett's agar | Very poor growth; no colors assigned. |
| Nutrient's agar | Fair growth, reverse grayish-yellow [11B2]; fair sporulation and aerial mycelium (W) white a; no soluble pigment. |
| Action on milk | No change after 14 days. |
| Nitrate reduction | Positive. |
| Melanine production | Positive. |
| Peptone-iron agar | Negative. |
| Tryptone yeast extract | Do. |
| Gelatin liquefaction | None at 14 days. |

TABLE IX—Continued

| Property observed | Characteristic |
| --- | --- |
| Temperature requirements | Growth and sporulation—fair at 26°; good at 30°; vegatative growth at 37° C.; a trace of growth, vegetative only at 43–49°. No growth at 55°. |
| Response of substrate mycelium to pH change | All media but ICP No. 4 unaffected. Change on ICP No. 4 from brown to white or colorless when treated with either 0.05 N HCl or 0.05 N NaOH. |
| Response of soluble pigment to pH change | No soluble pigment. |
| Carbon utilization: | |
|    L-arabinose | +. |
|    Sucrose | (−). |
|    D-xylose | (+). |
|    D-fructose | (+). |
|    Glucose | +. |
|    Rhamnose | +. |
|    Raffinose | +. |
|    I-inositol | +. |
|    D-mannitol | +. |
|    Minus carbon (control) | −. |

Note.—Utilization code:
+ = Positive.
(+) = Probable utilization.
(−) = Questionable utilization.
− = No utilization.

The culture medium employable in producing antibiotic A204 by cultivation of the above-described organism can be any one of several media, since, as is apparent from the above-described utilization tests, the organism is capable of utilizing different energy sources. However, for economy of production, maximum yield of antibiotic, and ease of isolation of the antibiotic, certain relatively simple nutrient sources are preferable. For example, the media which are useful in the production of the antibiotic include an assimilable source of carbon such as glucose, fructose, starch, glycerine, molasses, dextrin, brown sugar, and the like. The preferred source of carbon is glucose. Additionally, employable media include a source of assimilable nitrogen such as soybean meal, corn steep solids, yeast, cottonseed meal, beef extract, peptones (meat or soy), casein, amino acid mixtures and the like. Preferred sources of nitrogen are peptones, soybean meal, amino acid mixtures, and the like. Among the nutrient inorganic salts which can be incorporated in the culture media are the customary salts capable of yielding sodium, potassium, ammonium, calcium, phosphate, sulfate, chloride, carbonate, and like ions.

Minor elements necessary for optimum growth and development of the organism used for the production of antibiotic A204 should also be included in the culture medium. Such trace elements commonly occur as impurities in the other constituents of the medium in amounts sufficient to meet the growth requirements of the actinomycetes employed in this invention.

The initial pH of the culture medium can be varied. However, it has been found desirable that the initial pH of the medium be between about pH 6.5 and pH 7.5. As has been observed with other actinomycetes, the pH of the medium gradually increases throughout the growth period of the organism while the antibiotic is being produced, and may attain a level of from pH 7.0 to pH 7.6 or above, the final pH being dependent at least in part on the initial pH of the medium, the buffers present in the medium, and the period of time the organism is permitted to grow.

Submerged, aerobic cultural conditions are the conditions of choice for the production of antibiotic A204. For preparation of relatively small amounts, shake flask and surface culture in bottles can be employed; but for the preparation of large amounts, submerged aerobic culture in sterile tanks is preferred. The medium in the sterile tank can be inoculated with a sporulated suspension; but because of the growth lag experienced when a sporulated suspension is used as the inoculum, the vegetative form of the culture is preferred. By thus avoiding the growth lag, more efficient use of the fermentation equipment is realized. Accordingly, it is desirable first to produce a vegetative inoculum of the organism by inoculating a relatively small quantity of culture medium with the spore form of the organism; and when a young, active vegetative inoculum has been obtained, to transfer the vegetative inoculum aseptically to the large tank. The medium in which the vegetative inoculum is produced can be either the same as or different from the medium utilized for the large scale production of antibiotic A204.

The organism which produces antibiotic A204 will grow over a wide temperature range of between about 25–37° C. Optimal production of A204 seems to occur at temperatures of 26–30° C. In general, maximum production of the antibiotic occurs within about 48–72 hours after inoculation of the culture medium.

As is customary in aerobic, submerged culture processes, sterile air is blown through the culture medium. For efficient growth of the organism and antibiotic A204 production, the volume of air employed in the tank production of A204 is from 0.2 to 0.4 volume of air per minute per volume of culture. The preferred volume is 0.35 volume of air per minute per volume of culture medium.

The concentration of antibiotic activity in the culture medium can be followed readily during the fermentation period by testing samples of the culture medium for their inhibitory activity against the growth of organisms known to be inhibted by the presence of antibiotic A204. The organisms *Staphylococcus aureus*, *Sarcina lutea*, *Bacillus subtilis*, and *Mycobacterium avium* have been found useful for this purpose. The testing of the samples can be carried out by the well-known turbidometric or cup-plate methods.

In general, maximum production of the A204 mixture of antibiotics accurs within two to three days after inoculation of the culture medium in submerged aerobic or shake flask culture processes.

The antibiotic activity produced during the fermentation of A204 can occur either in the antibiotic broth or in the mycelium or in both places. Accordingly, isolation techniques employed in the production of A204 are designed to permit maximum recovery of the antibiotic from either or both sources. Thus, for example, the fermentation broth as obtained may be filtered and the filtrate extracted with a suitable solvent to recover the antibiotic activity not retained by the mycelial cake. In addition, the antibiotic present in the mycelial cake is recovered by through extraction with a suitable solvent. In either event, the antibiotic can be recovered from the extracting solvent by the ordinary methods commonly employed in the art.

As previously mentioned antibiotic A204 can be isolated from the fermentation medium in the free acid form or alternatively in the salt form by varying the pH of the combined aqueous filtered broth and the mycelium extract.

The antibiotic mixture is isolated in the free acid form by acidifying the combined broth and mycelium extract to a pH of about pH 3 with a mineral acid such as hydrochloric acid or sulfuric acid. The acidified broth is then extracted with a water immiscible solvent such as ethyl acetate, amyl acetate or other suitable organic extractant. Ethyl acetate is the preferred solvent for extracting the antibiotic A204 from the acidified broth. The acidified broth is extracted 3 times with a volume of ethyl acetate equal to about one-half the volume of broth. The extracts are combined and evaporated to dryness to provide a crude, solid A204 antibiotic mixture.

The crude antibiotic mixture is purified by chromatography of a chloroform solution of the mixture over a suitable adsorbent, for example, activated carbon, alumina or silica gel. The preferred adsorbent is activated carbon. The crude A204 mixture is dissolved in chloroform using 10 ml. of chloroform for each gram of solid A204 mixture and the solution is passed over a column packed with an amount of adsorbent corresponding to 2 g. of adsorbent per gram of A204 mixture.

The column is then eluted with approximately 5 to 10 times the original volume of chloroform. The chloroform eluate fractions containing the antibiotic are combined and evaporated to dryness in vacuo to yield the purified A204 antibiotic mixture as a white amorphous solid.

The purified mixture is obtained crystalline by crystallization from a suitable solvent or solvent mixture, for example, from a lower alcohol such as methanol, ethanol, isopropanol and the like. The A204 mixture is preferably recrystallized from methanol.

The A204 antibiotic mixture is isolated in the salt form from the fermentation medium in the following manner. The mycelium is filtered and extracted as before with an aqueous alcoholic solvent mixture, for example, 50 percent aqueous methanol. Repeated extractions of the mycelium are preferably performed to insure complete extraction of the antibiotic present in the mycelium. The extracts are combined and concentrated to an aqueous extract by evaporation of the alcohol component of the solvent mixture. The aqueous concentrate is combined with the filtered broth and the pH of the mixture is adjusted to about pH 8.5 by the addition of an alkali metal or alkaline earth metal hydroxide or carbonate. The cationic salts of the antibiotics comprising the A204 mixture formed thereby are then extracted from the basic broth with a suitable organic extractant such as ethyl acetate or amyl acetate. The A204 mixture of antibiotics so obtained commonly exists as the mixed cationic salts formed with the added alkali metal or alkaline earth metal hydroxides and with the previously scavenged cations from the broth, such as sodium and potassium.

The preferred solvent for extracting the A204 mixture of antibiotics from the basic broth is ethyl acetate. It is desirable to carry out the extraction 3 times using fresh ethyl acetate each time with a volume of ethyl acetate equal to about one-half the volume of broth. The extracts are combined and evaporated to dryness to yield the A204 mixture of antibiotics in the mixed cationic salt form.

According to the practice of this invention it is preferred to basify the aqueous broth with either sodium or potassium hydroxide. The A204 mixture of antibiotics is thereby obtained as a mixture of cationic salts.

The A204 mixture in the salt form is further purified by chromatography over a suitable adsorbent such as activated carbon or alumina. The chromatography is carried out by passing a chloroform solution of the A204 in salt form over the adsorbent, preferably carbon and combining the eluate fractions containing the antibiotic. The combined fractions are evaporated to dryness to yield the purified A204 mixture in the salt form as a white amorphous powder.

Antibiotics A204I and A204II are separated from the A204 mixture in the salt form, obtained as described above, by chromatography over a suitable adsorbent. Adsorbents which can be employed in the separation of the A204 factors include the nonionic adsorbents such as silica gel, alumina and the like. Silica gel is the preferred adsorbent in this invention. The mixed sodium and potassium salt of the A204 antibiotic mixture is dissolved in a solvent system consisting of benzene:ethyl acetate (7:3) and the solution is passed over a column packed with silica gel. The column is first eluted with a benzene:ethyl acetate (7:3) mixture to obtain factor A204I as the mixed sodium and potassium salt in the eluate. After all of factor A204I is collected in the eluate as determined by thin layer chromatography, the eluant is changed to a 1:1 mixture of benzene:ethyl acetate and multiple fractions of eluate are collected. The latter fractions containing factor A204II as the mixed sodium and potassium salt are combined and evaporated to dryness. The solid residue is recrystallized from acetone-water to yield a crystalline solid comprising mainly A204II mixed sodium and potassium salt.

The A204II factor is purified by repeating the chromatography over silica gel and is obtained crystalline from acetone-water in the form of its mixed sodium and potassium salt.

In the practice of this invention it is preferred to isolate the A204 mixture and to separate the A204 factors thereof in the salt form. The A204 factors and mixture thereof exhibit enhanced stability in the salt form, which aids in their isolation and purification.

The individual factors A204I and A204II can be obtained as the free acids by treating the mixed salts thereof obtained as described above with a mineral acid such as hydrochloric acid or sulfuric acid.

The following examples are provided to more fully illustrate the present invention.

EXAMPLE 1

Shake flask production of antibiotic A204

The production of antibiotic A204 in shake flask cultures is illustrated by the following example:

Spores of *Streptomyces albus* NRRL 3384 were inoculated on a nutrient agar slant made up of 10 g. of dextrin, 2 g. of an enzyme digested casein, 1 g. of beef extract, 1 g. of yeast extract, 20 g. of agar and sufficient water to make a total volume of 1 liter. The slants were inoculated with spores of *Streptomyces albus* NRRL 3384 and incubated for four to five days at 30° C. The slants were covered with sterile distilled water and gently scraped to remove the organisms and provide an aqueous suspension thereof. One milliliter of the resulting spore suspension was used to inoculate each 100 ml. portion of the vegetative medium.

The vegetative culture meduim was prepared by combining 15 g. of glucose, 15 g. of soybean meal, 5 g. of corn steep solids, 5 g. of sodium chloride, 2 g. of calcium carbonate, and sufficient tap water to make the total volume 1 liter. The vegetative inoculum was shaken for 48 hours at 30° C. on a reciprocal shaker having a 2-inch stroke at 108 r.p.m. The inoculum so prepared was then utilized in the production of antibiotic A204 as follows.

A production medium was prepared having the following composition:

| | G./l. |
|---|---|
| Soybean meal | 15 |
| Casein | 1 |
| $NaNO_3$ | 3 |
| Glucose syrup | 20 |
| $CaCO_3$ | 2.5 |
| Tap water. | |

One hundred milliliter portions of the production medium were placed in five hundred milliliter Erlenmeyer flasks, which were then sterilized at 120° C. for 30 minutes. When cooled, each flask was inoculated with a 5 percent vegetative inoculum prepared as previously described.

The production flasks were shaken for 48 hours at 30° C., on a rotary shaker operating at 250 r.p.m. The pH of the uninoculated medium varied over a pH range of 6.5 to 7.5. The harvest pH at the end of the fermentation cycle was between 7.0 to 7.6. The antibiotic activity was found in both the broth and the mycelium. This activity was determined by assaying the broth and the mycelium against *Bacillus subtilis*, using known disc or cup-plate methods.

The whole broth (25 liters) obtained by the above procedure, was filtered in vacuo with the aid of diatomaceous earth. The mycelial cake was extracted three times with one-half volume of 50 percent aqueous methanol. The three mycelial extracts were combined and concentrated in vacuo to remove the methanol. The filtered broth and the aqueous concentrate of the mycelial extract solutions were combined, the pH of the mixture adjusted to pH 3 with hydrochloric acid, and the solution was extracted two times with one-half volume of ethyl acetate. The ethyl acetate extracts were combined and concentrated to dryness, redissolved in chloroform (10 ml. for each gram of solids), and the chloroform solution passed through a 12″ × 40″ column of Pittsburgh carbon containing 2 g. of carbon for each gram of solids. The column was then eluted with 5 to 10 times the original volume of chloroform.

The chloroform eluate fractions were combined, concentrated to dryness in vacuo, dissolved in a small amount of warm methanol, chilled, and the resulting crystals filtered. Recrystallization produced 8.9 g. of antibiotic A204 crystals having a potency of from 1,200 to 1,400 microbiological units/mg. The crystals were identified as antibiotic A204 by NMR, IR, thin-layer chromatographic, and paper chromatographic studies.

EXAMPLE 2

Production of antibiotic A204

Antibiotic A204 was produced according to the process of Example 1, but utilizing a production medium having the following composition:

|  | G. |
|---|---|
| Glucose | 15 |
| Soybean meal | 15 |
| Cornsteep solids | 5 |
| NaCl | 5 |
| $CaCO_3$ | 2 | and sufficient tap water to bring the total volume to 1 liter.

EXAMPLE 3

Antibiotic A204 was produced according to the process of Example 1, but utilizing a production medium having the following composition:

|  | G. |
|---|---|
| Glucose | 20 |
| $(NH_4)_2SO_4$ | 5 |
| $CaCO_3$ | 8 |
| KCl | 4 |
| $KH_2PO_4$ | 0.4 |
| Soybean meal | 5 | and sufficient tap water to bring the total volume to 1 liter.

EXAMPLE 4

Antibiotic A204 was produced according to the process of Example 1, but utilizing a production medium having the following composition:

|  | G. |
|---|---|
| Glucose | 10 |
| Edible molasses | 20 |
| Peptone | 5 |
| $CaCO_3$ | 2 | and sufficient tap water to bring the total volume to 1 liter.

EXAMPLE 5

Pilot plant production of antibiotic A204

The production of antibiotic A204 by submerged fermentation on a pilot plant scale is illustrated by the following procedure:

A 250 ml. flask containing 50 ml. of a vegetative medium comprising 10 g./l. dextrose, 25 g./l. soluble starch, 15 g./l. nutrisoy grits, 10 g./l. cornsteep liquor, and 2 g./l. $CaCO_3$ in tap water, having an adjusted pH of 6.5 (NaOH), was inoculated with a 5 percent suspension obtained according to the method described in Example 1 from a nutrient agar slant culture comprising 10 g. glucose, 10 g. yeast extract, 5 g. NaCl, 0.01 g. $FeSO_4 \cdot 7H_2O$, 0.25 g. $MgSO_4 \cdot 7H_2O$, and 20 g. Meer agar (washed three times) in one liter of deionized water. The inoculated vegetative medium was incubated at about 30° C. for 48 hours on a rotary shaker having a 2-inch diameter arc, operating at 250 r.p.m. A 16 ml. portion of the vegetative culture so obtained was employed to inoculate a 1 liter flask containing 200 ml. of the vegetative medium. The inoculated vegetative medium was incubated at about 30° C. for 30 hours on a rotary shaker having a 2-inch diameter arc, operating at 250 r.p.m. A 200 ml. portion of the vegetative culture so obtained was employed to inoculate a 40 liter fermenter containing 25 liters of a sterilized aqueous fermentation medium comprising 0.2 g./l. of Dow Corning Antifoam, 25 g./l. dextrose, 15 g./l. nutrisoy grits, 3 g./l. blackstrap molasses, 1 g./l. casein and 2.5 g./l. $CaCO_3$ in tap water. The fermentation was maintained at a temperature of 30° C. for 30 hours after inoculation. Agitation at the rate of 420 r.p.m. was carried out throughout the fermentation. Aeration throughout the fermentation was at a rate of 0.4 cubic feet of air per cubic feet of medium per minute. Isolation of the A204 antibiotic mixture was carried out as described in Example 1.

EXAMPLE 6

Isolation of antibiotic A204 mixed sodium and potassium salt

Twenty-five liters of whole broth obtained as described in Example 1 was filtered in vacuo with the aid of a filter aid. The mycelium was extracted three times with one-half volume of 50 percent aqueous methanol. The mycelial extracts were combined and evaporated in vacuo to remove the methanol. The filtered broth and aqueous concentrate of the mycelial extract were combined and the pH adjusted to pH 8.5 by the addition of an aqueous solution of sodium hydroxide. The basified broth was then extracted two times with one-half volumes of ethyl acetate and the extracts combined. The combined extracts were evaporated in vacuo to yield a crude solid antiobiotic A204 residue in the mixed sodium and potassium salt form.

The crude A204 salt mixture was purified by chromatography of a chloroform solution of the salt mixture over carbon as described in Example 1 for the A204 free acid form. The purified A204 mixed sodium and potassium salt was obtained crystalline by recrystallization from aqueous acetone.

EXAMPLE 7

Preparation of the sodium salt of antibiotic A204

To 100 mg. of antibiotic A204, obtained in Example 1 and dissolved in one ml. acetone, was added one drop of 5 N NaOH and one ml. water. The mixture was clarified by heating slightly, and allowed to stand at −15° C. until crystallization occurred. The crystals were filtered and recrystallized from aqueous alcohol to yield 72 mg. of the sodium salt of antibiotic A204.

EXAMPLE 8

Preparation of the potassium salt of antibiotic A204

The potassium salt is obtained by substituting one drop of 5 N KOH for the 5 N NaOH of the above method.

EXAMPLE 9

Preparation of the silver salt of antibiotic A204

Six hundred and seventy milligrams of the sodium salt of antibiotic A204 were dissolved in 40 ml. methanol, mixed with a solution of 270 mg. of silver nitrate in 2 ml. water, and allowed to stand at room temperature for 3 hours in the dark. The solution was evaporated to dryness and washed with water to remove the excess silver nitrate. The residue was dissolved in 10 ml. of methanol with heat, filtered through a sintered glass funnel while hot, and allowed to stand 16 hours at 50° C. Large white rectangular crystals of the silver salt of antibiotic A204 were obtained, and were recrystallized from aqueous acetone to yield 450 mg. of the silver salt of antibiotic A204.

EXAMPLE 10

Isolation of antibiotic A204 factors

Mixed sodium potassium antibiotic A204 salt (100 g.), obtained as described in Example 6 was dissolved in 500 ml. of a benzene:ethylacetate (7:3) mixture. The solution was chromatographed over a column containing 2,000 g. of silica gel (Grace-Davison Chemical Co. Grade 62). The elution was carried out with a benzene:ethylacetate (7:3) mixture, and the elution of the fractions was followed by silica gel thin layer chromatography using ethyl acetate as the developing solution and an $H_2SO_4$ spray for detection. A204I was eluted first. After approximately 32 liters of solvent was collected, the solvent was changed to a benzene-ethylacetate (1:1) solution. The elution was continued until no further spots were detected on the silica gel-TLC plates.

The fractions containing high concentrations of A204II were combined, concentrated to dryness, and crystallized from an acetone-water solution. The resulting crystals (3 g.) were rechromatographed on a column containing 71 g. of silica gel in a benzene:ethyl acetate (7:3) mixture and again following the elution by TLC. The fractions containing only A204II were combined, concentrated to dryness, and crystallized in an acetone-water solution to yield 788 mg. of crystalline A204II as the mixed sodium and potassium salt (M.P. 177–179° C., having an activity equal to 1550 units of A204/ml.).

The A204I containing eluate was evaporated to dryness in vacuo to yield the mixed sodium and potassium salt of antibiotic A204I as a white amorphous powder.

EXAMPLE 11

Preparation of the ammonium salt of antibiotic A204

Two hundred milliliters of antibiotic A204, prepared according to Example 1, were dissolved in 10 ml. of acetone. Five ml. of water was then added slowly to the acetone solution, and the pH of the solution was adjusted to pH 9 with concentrated ammonium hydroxide. The crystals which formed immediately were allowed to stand overnight at 5° C., filtered, washed with water, and dried in vacuo to yield 189 g. of the ammonium salt of antibiotic A204, M.P. 144–145° C.

EXAMPLE 12

Preparation of the copper salt of antibiotic A204

Five hundred milliliters of antibiotic A204, prepared according to Example 1, were dissolved in 15 ml. of acetone and 7.5 ml. of water. A 0.1 M solution of copper acetate was added slowly until the solution became turbid, and light-blue crystals formed. The crystals were filtered, washed with water, and dried in vacuo to yield 520 mg. of the copper salt of antibiotic A204, M.P. 135–136° C.

EXAMPLE 13

Preparation of the zinc salt of antibiotic A204

Five hundred milliliters of antibiotic A204, prepared according to Example 1, were dissolved in 15 ml. of acetone and 7.5 ml. of water. Three milliliters of 2 N zinc bromide were then added slowly, and the solution was concentrated to an oil. The oil was allowed to stand for several days at room temperature, during which time crystals formed. The crystals were filtered, washed with water, and dried in vacuo to yield 460 mg. of the zinc salt of antibiotic A204, M.P. 142–144° C.

EXAMPLE 14

Preparation of the barium salt of antibiotic A204

Four hundred milliliters of antibiotic A204, prepared according to Example 1, were dissolved in 20 ml. of methanol, and 9 ml. of water were added thereto. The pH of the solution was adjusted to pH 9.5 by the addition of a saturated solution of barium hydroxide. The methanol was allowed to evaporate at room temperature, whereupon crystals of the barium salt of antibiotic A204 formed. The crystals were filtered, washed with water, and dried in vacuo to yield 385 mg. of the barium salt of antibiotic A204, M.P. 142–143° C.

We claim:

1. The antibiotic A204I, or the cationic salts thereof, said antibiotic being a white crystalline compound melting at 96–98° C.; which is soluble in ethyl acetate, acetone, benzene, chloroform, dimethylformamide, and dimethylsulfoxide, is slightly soluble in ethyl alcohol, and is very slightly soluble in water; which is acidic, having one titratable group with a pK'a value of 6.1 as determined by electrometric titration in 66 percent aqueous dimethylformamide; which has an apparent molecular weight of about 900 as determined from the titration data; which has the approximate elemental composition of 61.74 percent carbon, 9.37 percent hydrogen and 28.38 percent oxygen; which has a specific optical rotation $[\alpha]_D^{25}$ of plus 68.12° (C=1 percent, w./v. in methanol); which as a solution in chloroform has the following distinguishable bands in its infrared absorption spectrum over the range of 2.0 to 15.0 microns: 2.95, 3.43, 5.95, 6.87, 7.26, 7.80, 8.52, 8.15, 9.17, 9.34, 9.59, 9.82, 10.07, 10.24, 10.51, 10.77, 11.40, and 11.80 microns; and which has no characteristic ultraviolet absorption spectrum.

2. The antibiotic A204II or the cationic salts thereof, which antibiotic in the form of its mixed sodium and potassium cationic salt is a white, crystalline compound soluble in ethyl acetate, acetone, benzene, chloroform, dimethylformamide, and dimethylsulfoxide, is slightly soluble in ethyl alcohol and is very slightly soluble in water; which has one titratable group with a pK'a value of 6.3 as determined by electrometric titration in 66 percent aqueous dimethylformamide; which has a specific rotation, $[\alpha]_D^{25}$ of +42.3° (C=1 percent w./v., methanol); which has the approximate elemental composition of 60.66 percent carbon 8.76 percent hydrogen and 27.9 percent oxygen; which as a solution in chloroform has the following distinguishable bands in its infrared absorption spectrum over the range of 2.0 to 15.0 microns; 3.20, 3.45, 6.26, 6.90, 7.30, 8.20, 8.50, 8.80, 9.22, 9.39, 9.59, 9.70, 9.82, 10.08, 10.26, 10.48, 10.83, 10.96, 11.30, 11.55 and 11.78 microns; and which has no characteristic ultraviolet absorption spectrum.

3. The method of producing antibiotic A204I of claim 1 and the antibiotic A204II of claim 2 which comprises cultivating *Streptomyces albus* NRRL 3384 in an aqueous, nutrient culture medium containing assimilable source of carbon, nitrogen and inorganic salts under submerged aerobic fermentation conditions until a substantial amount of antibiotic activity is produced by said organism in said culture medium.

4. The method of producing antibiotic A204I of claim 1 which comprises cultivating *Streptomyces albus* NRRL 3384 in an aqueous, nutrient culture medium containing assimilable sources of carbon, nitrogen and inorganic salts under submerged aerobic fermentation conditions until a substantial amount of antibiotic activity is produced by said organism in said culture medium, recovering said antibiotic from said culture medium and isolating antibiotic A204I free of antibiotic A204II of claim 2 by chromatography over a non-ionic absorbent.

5. The method of producing antibiotic A204II of claim 2 which comprises cultivating *Streptomyces albus* NRRL 3384 in an aqueous, nutrient culture medium containing assimilable sources of carbon, nitrogen and inorganic salts under submerged aerobic fermentation conditions until a substantial amount of antibiotic activity is produced by said organism and said culture medium and recovering said antibiotic from said culture medium and isolating antibiotic A204II free of antibiotic A204I of claim 1 by chromatography over a non-ionic absorbent.

6. The method of controlling coccidiosis in poultry which comprises incorporating in the diet of said poultry at a level of from 9 to 45 g. per ton of an antibiotic compound selected from the group consisting of antibiotic A204I as defined in claim 1, antibiotic A204II, as defined in claim 2, and the cationic salts thereof.

7. The method of claim 5 wherein the antibiotic compound is antibiotic A204I.

8. The method of claim 5 wherein the antibiotic compound is antibiotic A204II.

9. The method of claim 5 wherein the antibiotic compound is the sodium salt of antibiotic A204I.

10. The method of claim 5 wherein the antibiotic compound is the potassium salt of antibiotic A204I.

References Cited

Miller: The Pfizer Handbook of Microbial Metabiotics McGraw-Hill Book Co., Inc., N.Y., 962, pp. 573, 574 and 591.

JEROME D. GOLDBERG, Primary Examiner

U.S. Cl. X.R.

195—80